(12) United States Patent
Berstis

(10) Patent No.: US 6,226,761 B1
(45) Date of Patent: May 1, 2001

(54) POST DUMP GARBAGE COLLECTION

(75) Inventor: Viktor Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/159,956

(22) Filed: Sep. 24, 1998

(51) Int. Cl.⁷ .............................. H02H 3/05; G06F 12/00
(52) U.S. Cl. ................... 714/37; 707/206; 714/38
(58) Field of Search ................... 714/37, 25, 1, 714/38, 13, 15, 4; 707/206, 103, 200, 205; 711/165, 154, 170

(56) References Cited

U.S. PATENT DOCUMENTS

| 4,121,286 | 10/1978 | Venton et al. ................. 364/200 |
|---|---|---|
| 4,775,932 | 10/1988 | Oxley et al. .................. 364/200 |
| 5,218,698 | 6/1993 | Mandl ........................ 345/650 |
| 5,692,185 * | 11/1997 | Nilsen et al. ................. 395/615 |
| 6,067,604 * | 5/2000 | Ramachandran et al. ........... 711/149 |
| 6,148,417 * | 11/2000 | Da Silva ..................... 714/25 |

OTHER PUBLICATIONS

Gupta, Aloke and Fuchs, W. Kent, "Garbage Collection in a Distributed Object–Oriented System", IEEE Transactions on Knowledge and Data Engineering, vol. 5 pp. 257–265, Apr. 1993.*

Kwon, Young–Jun, Mathew, Ben and Hao, Hong, "Fake Fault: A Silicon Debug Software Dool for Microprosessor Embedded Memory Arrays", IEEE International Test Conference Paper 29.3 pp. 727–732, Aug. 1998.*

* cited by examiner

*Primary Examiner*—Robert Beausoleil
*Assistant Examiner*—Rita Ziemer
(74) *Attorney, Agent, or Firm*—Jeffrey S. LaBaw; Felsman, Bradley, Vaden, Gunter & Dillon, LLP

(57) ABSTRACT

The operating system or memory management mechanism for a lean client or network computer, or any other data processing system, employs a garbage collection memory management model in which live references to an object are periodically surveyed and disconnected storage is deallocated when no live references to object(s) contained within that storage remain. System dumps taken at the time of a failure or fatal error may include such disconnected data storage which was not garbage-collected prior to the system failure. The presence of such extra data increases the size of the dump, complicates searches through the dump, and potentially results in false search hits if apparently pertinent data is found within disconnected storage. To eliminate the extra data and facilitate debugging, a dump formatter or dump tool automatically performs a post-dump garbage collection, filtering the dump file in a manner similar to garbage collection on the original running system. Disconnected data is discarded and the size of the dump is generally reduced. Debug time and complexity may thus be reduced.

20 Claims, 3 Drawing Sheets

POST DUMP GARBAGE COLLECTION

BACKGROUND OF THE INVENTION

1. Technical Field

The present invention relates in general to error isolation in data processing systems and in particular to debugging the dump file of an operating system within a data processing system. Still more particularly, the present invention relates to reducing the size and complexity of an operating system dump file to be debugged.

2. Description of the Related Art

"Lean client" devices, also referred to as network computers, are finding widespread acceptance for corporate computing needs, which typically may be satisfied largely through use of a limited set of applications, The increasing popularity of such devices and the advent of new programming languages such as Java has led to the development of new operating systems. For example, JavaOs provides a standalone application platform designed specifically for network computers. JavaOS utilizes a layered architecture, where each layer can be independently updated, and includes a microkernel and memory manager, device drivers, the Java Virtual Machine (JVM), graphics and windowing systems, networking classes, and support for the full Java API.

JavaOS employs and conforms to the Java programming language specification which, like several other programming languages such an LISP and SNOBOL, utilizes a memory management model a including "garbage collection" scheme. Various garbage collection schemes are known in the art, many of which are described in *Garbage Collection: Algorithms for Automatic Dynamic Memory Management* (ISBN 0471941484). Mark-sweep garbage collection, for example, involves recursively following pointers from a set of base pointers and setting a mark bit for each storage area identified by a pointer within an actively used storage area, then sweeping the storage structure looking for unmarked allocations and deallocating disconnected storage. As another example, garbage collection may be based upon a reference-counting mechanism which increments the reference count of an object contained within allocated storage when a live reference to that object enters the Java virtual machine.

With all garbage collection schemes, system memory allocation is periodically examined by surveying pointers or memory references. As long as at least one live reference exists for an object, the object cannot be garbage-collected and the storage containing the object cannot be deallocated. When no live references or pointers are found referencing an object or a specific, allocated portion of system memory, that memory is deallocated. This memory region is called "disconnected storage." System memory is then purged of inaccessible or "disconnected" storage objects—previously allocated storage which is no longer accessible because no remaining pointers from actively utilized storage areas to the subject storage area exist—while remaining objects are consolidated or moved to eliminate fragmentation between active, allocated storage areas. As objects are moved, all pointers referencing the object are updated with the object's new location.

Garbage collection eliminates the need for programmers to explicitly deallocate memory and automatically reduces fragmentation. In the Java VM, since garbage collection automatically reduces fragmentation of system memory, the garbage collection memory management scheme is well-suited for compact data processing systems having limited memory resources. The use of ouch a scheme in an operating system tailored for lean client or network computers is thus a logical choice.

During debug, a system dump of the entire memory is typically taken at the time of failure. Afterward, programmers must go through this dump looking for the problem which caused the failure. In a Java environment for example, due to the garbage collection scheme of memory deallocation, extra data not yet deallocated by garbage collection is generally present within the system dump. This increases the size of the data dump, slows down searches through the dump, and in some cases may lead to false search results since possibly pertinent data may appear to be located within disconnected storage. This may result in the debugging process taking longer, and may even hinder successful debugging of the system failure.

Garbage collection, while known in the art, is essentially a mechanism for keeping a data processing system running smoothly and efficiently by automatically deallocating disconnected storage. System dumps, on the other hand, are taken after a data processing system has crashed and is no longer running. Therefore, the need for automatically deallocating disconnected storage no longer exists at the time the system dump is taken or debugged. Accordingly, post dump garbage collection has not previously been considered in the art.

It would be desirable, therefore, to reduce the occurrences of disconnected storage within a system memory dump after system failure.

SUMMARY OF THE INVENTION

It is therefore one object of the present invention to provide an improved mechanism for error isolation in data processing systems.

It is another object of the present invention to provide an improved method and apparatus for debugging the dump file of an operating system within a data processing system.

It is yet another object of the present invention to provide a method and apparatus for reducing the size and complexity of an operating system dump file to be debugged.

The foregoing objects are achieved as is now described. The operating system or memory management mechanism for a lean client or network computer, or any other data processing system, employs a garbage collection memory management model in which live references to an object are periodically surveyed and disconnected storage is deallocated when no live references to object(s) contained within that storage remain. System dumps taken at the time of a failure or fatal error may include such disconnected data storage which was not garbage-collected prior to the system failure. The presence of such extra data increases the size of the dump, complicated searches through the dump, and potentially results in false search hits if apparently pertinent data is found within disconnected storage. To eliminate the extra data and facilitate debugging, a dump formatter or dump tool automatically performs a post-dump garbage collection, filtering the dump file in a manner similar to garbage collection on the original running system. Disconnected data is discarded and the size of the dump is generally reduced. Debug time and complexity may thus be reduced.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
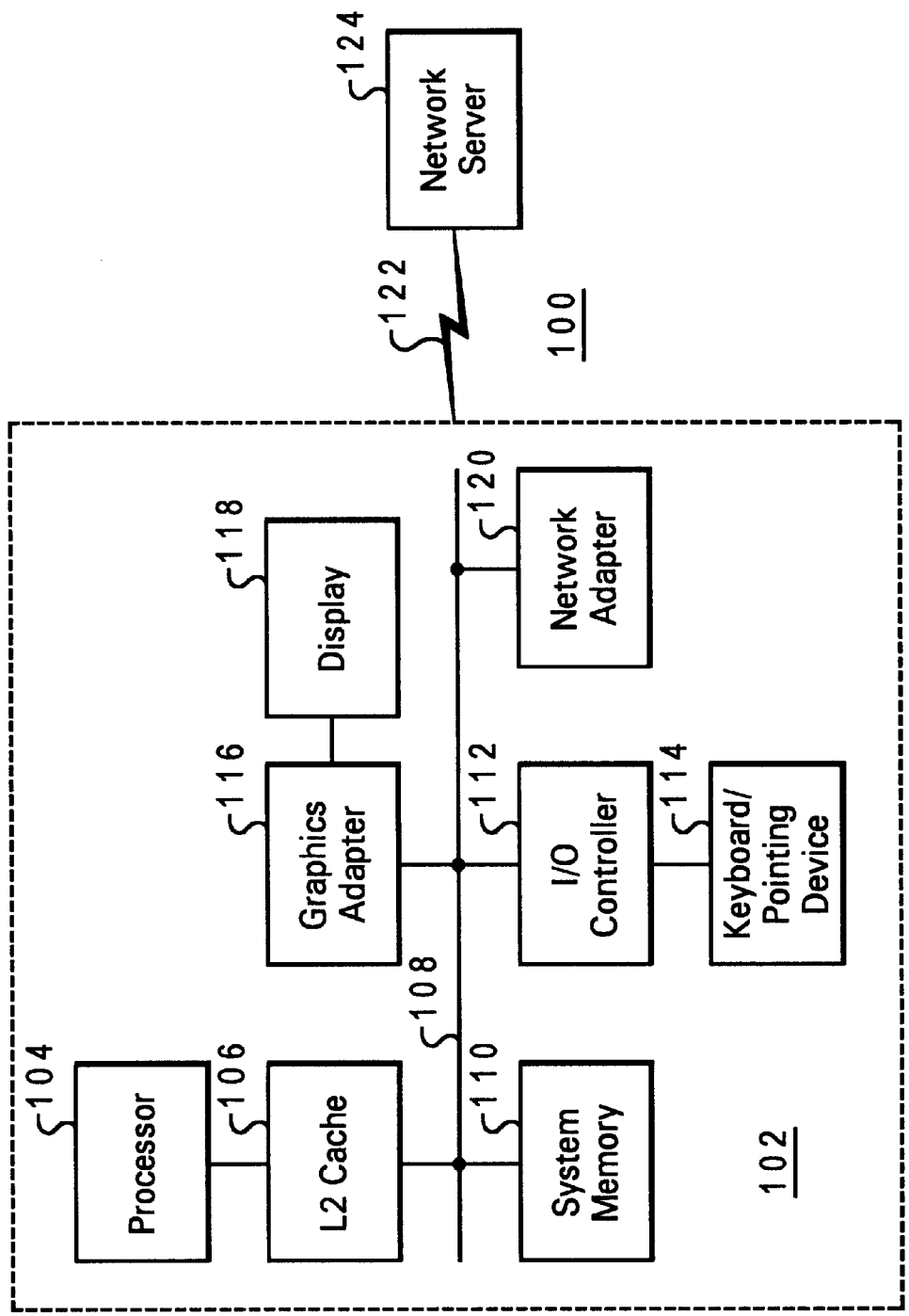
FIG. 1 depicts a block diagram of a data processing system network in which a preferred embodiment of the present invention may be implemented.

With reference now to the figures, and in particular with reference to FIG. 1, a block diagram of a data processing system network in which a preferred embodiment of the present invention may be implemented is depicted. Data processing system network 100 includes a lean client or network data processing system 102. Data processing system 102, in turn, includes a processor 104 connected, in the exemplary embodiment, to a level two (L2) cache 106, which is connected in turn to a system bus 108.

Also connected to system bus 108 is system memory 110 and input/output (I/O) controller 112. I/O controller 112 couples input devices such as a keyboard and/or pointing device (conventional mouse, trackball, trackpoint, etc.) 114 to system bus 106. In a preferred embodiment, data processing system 102 also includes graphics adapter 116 connected to system bus 108, receiving display data for monitor or display 118. Data processing system 102 further includes a network adapter 120 for connecting data processing system 102 to a network.

Data processing system 102 is coupled via communications link 122, such as an Ethernet protocol network, to network server 124. Data processing system 102 need not include local, nonvolatile storage, but may instead include within a power-on self-test (POST) routine stored within a read-only memory (ROM) (not shown) instructions allowing processor 104 to initialize network adapter 120 and transmit a request from data processing system 102 to network server 124 over communications link 122. Network server 124 may then respond to that request by transferring operating system modules and application executables to data processing system 102 to be loaded into system memory 110. Lean client or network data processing system 103 is thus essentially booted over the network and may contain no local data storage other than system memory 110.

Data processing system 102 preferably operates utilizing the JavaOS operating system, available from International Business Machines Corporation of Armonk, N.Y., or a similar operating system and/or memory management system employing the garbage collection memory management model. Data processing system 102 may include a browser such as HotJava. Java and HotJava are available from, and trademarks of, Sun Microsystems, Inc. of Mountain View, Calif. Data processing system 102 should include functionality for transmitting a dump of system memory 110 to network server 124 upon system failure utilizing a BIOS segment in accordance with the known art, and may optionally include functionality allowing a network administrator or programmer to take a dump of system memory for storage in network server 124 or other storage media to examine system operation or debug an application under development. Regardless of how the system dump is taken, data processing system network 100 should include the capability of post-dump garbage collection described below.

The exemplary embodiment shown in FIG. 1 is provided solely for the purposes of explaining the invention and those skilled in the art will recognize that numerous variations of the components depicted in FIG. 1 and described above are possible, both in form and function, and also that the present invention may be employed with equal benefit in other types of data processing systems. Such variations in which the present invention may be implemented are considered to be within the spirit and scope of the present invention.

Figure 2:
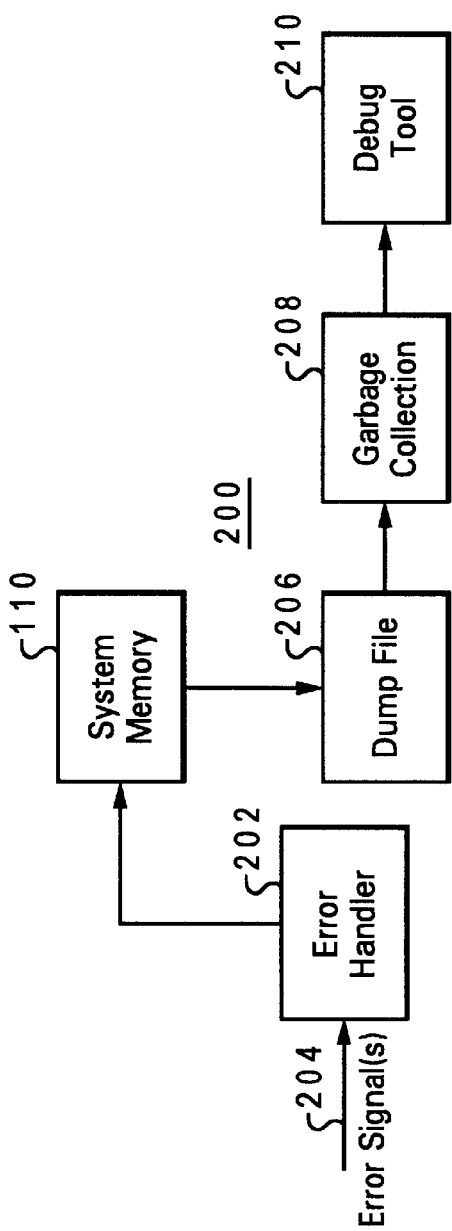
FIG. 2 is a block diagram of system modules implementing post-dump garbage collection in accordance with a preferred embodiment of the present invention.

With reference now to FIG. 2, a block diagram of system modules implementing post-dump garbage collection in accordance with a preferred embodiment of the present invention is depicted. The modules depicted are preferably implemented within a data processing system network of the type illustrated in FIG. 1, and includes operating system components and applications which may be distributed among various layers of a layered architecture such as JavaOS and/or within a debug tool.

The post dump garbage collection mechanism 200 of the present invention includes a system error handler 202 receiving error signal(s) 204 from the operating system. In response to a fatal system error (one which violates the data integrity mechanism, corrupts critical operating components loaded in memory, or otherwise results in a nonrecoverable system failure), error handler 202 causes the contents of system memory 110 to be copied to dump file 206, which may be located on a network server. Error handler 202 may also respond to commands or requests from a programmer or network administrator by copying the contents of system memory 110 to dump file 206. Network administrators may wish to take a dump of system memory 110 to determine what activity is taking place within the data processing system or to evaluate the performance of the data processing system. Programmers writing applications for data processing system 102 may desired to take a system dump when debugging the application. The data dump within dump file 208 provides a snapshot of the system at the time of system failure or intentional dump for debugging purposes. This will include, for instance, the device status of all devices within the system, the contents of all system registers, video buffers, etc.

Following the system failure or intentional dump, the contents of dump file 206 is retrieved and examined for debugging. The data processing system in which the system failure or intentional dump occurred may be re-initialized, or the contents of dump file 206 copied for examination utilizing a debug tool operating in a different data processing system than that in which the fatal system error or intentional dump occurred.

In the present invention, before the debug tool is employed to analyze the contents of dump file 206, the contents of dump file 206 are first filtered by garbage collection module 208. The actions of garbage collection module 208 are essentially identical to what the garbage collector would have done on the originally running system. References and/or pointers are surveyed, disconnected data is discarded, and the size of the data dump is generally reduced. The movement of data storage and updating of pointers to automatically reduce fragmentation is optional within garbage collection module 208, but may be desirable to reduce the size of the dump data. The filtered dump file 206 is then passed to the debug tool 210. Although depicted as separate from debug tool 210 in FIG. 2, garbage collection module 208 may actually form a part of debug tool 210 or a dump formatter employed by debug tool 210.

Garbage collection on a dump file would proceed in essentially the same fashion as garbage collection within the live machine. However, it is possible that any fatal error resulting in the system dump may have corrupted the pointers to memory. In this case, garbage collection on the dump will identify such corrupted pointers and may actually facilitate the debug process by focusing attention on obvious pointer problems.

Figure 3:
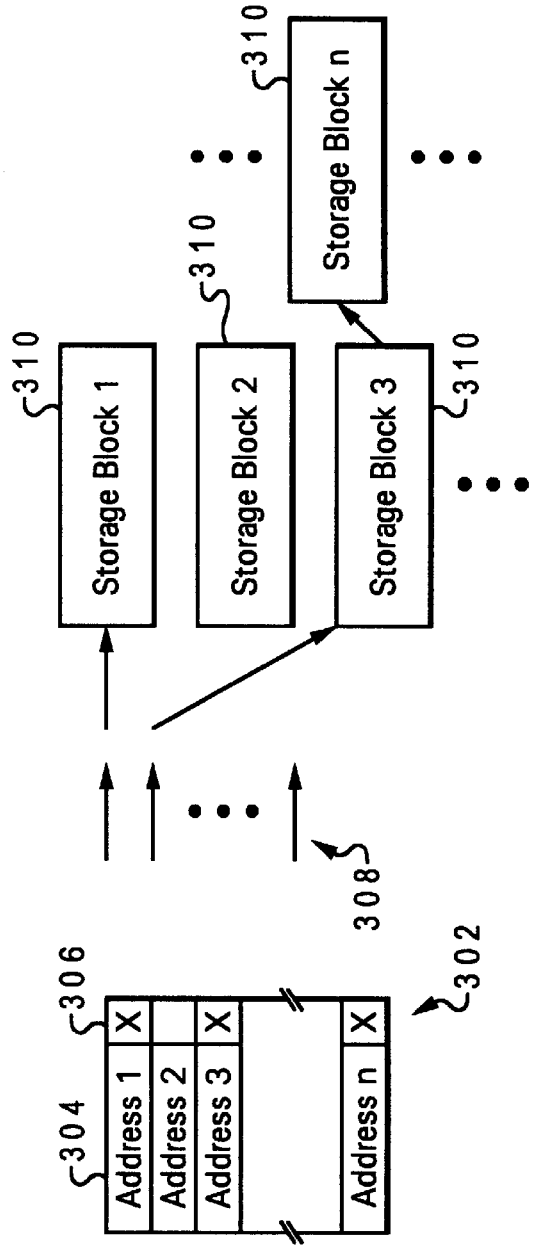
FIG. 3 is a diagram of a system memory allocation table and storage system employed in conjunction with a preferred embodiment of the present invention.

With reference now to FIG. 3, a diagram of a system memory allocation table and storage system employed in conjunction with a preferred embodiment of the present invention is depicted. The post-dump garbage collection mechanism of the present invention preferably utilizes the mark-sweep garbage collection scheme. Allocation table 302 from the system dump contains the addresses of storage blocks 310 which are or may be allocated. At least during garbage collection, each address 304 within allocation table 302 has an associated mark bit 306. The mark bit may be stored with the allocated object or elsewhere. The entire storage of the dump file is then examined.

Starting with a set of base or anchor pointers 308, pointers or references within all active storage blocks 310 of the dump file are recursively traced. Where a pointer or reference to a storage block from another active storage block exists, the corresponding mark bit is set, When the entire storage system has been examined, storage blocks for which the mark bit was not set are deallocated, and the remaining storage blocks may be optionally consolidated. In this manner, disconnected storage may be identified and deallocated prior to debugging the dump file.

Figure 4:
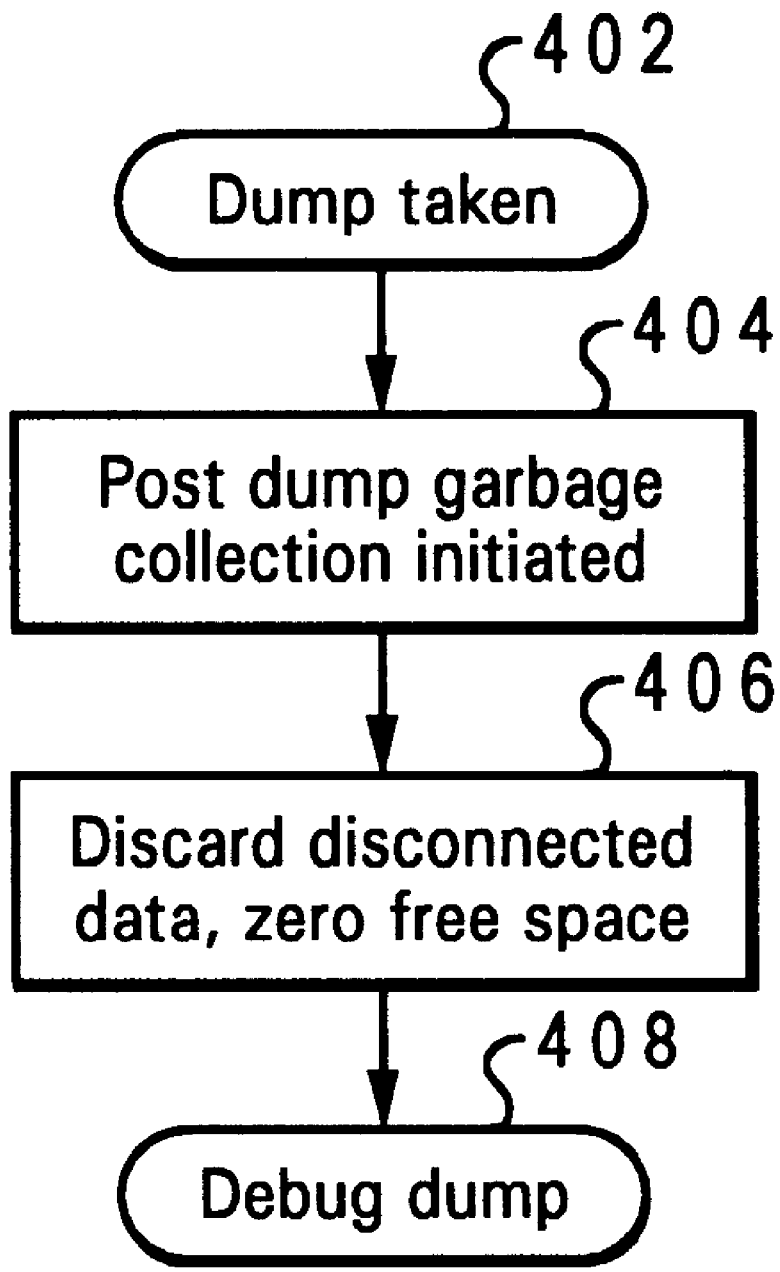
FIG. 4 is a high level flowchart for a process of filtering dump data prior to debug in accordance with a preferred embodiment of the present invention.

Referring to FIG. 4, a high level flowchart for a process of filtering dump data prior to debug in accordance with a preferred embodiment of the present invention is illustrated. The process begins at step 402, which depicts a dump being taken of the entire system memory at the time of system failure. The process then passes to step 404, which illustrates performing a post-dump garbage collection on the dump data. This may be performed by any garbage collection method known to those in the art. The process next passes to step 406, which depicts discarding disconnected data, if any, is located. At this time, remaining allocated storage may optionally be consolidated to reduce fragmentation. The process then proceeds to step 408, which illustrates debugging the dump data utilizing methods known in the art.

Any other formatting or similar rearrangement of the system dump which is required by or beneficial for debugging may be performed concurrently with the garbage collection. Additionally, the dump may be loaded into a system having debud capabilities and run from the point of system failure causing the dump to be taken. In this manner, it the system failure was caused, for example, by a continuous loop, the loop may be more readily identified by running the system from the point of failure.

The automatic post-dump garbage collection function of the present invention may substantially reduce the size of dump data. This may reduce the time required to debug the dump data, and eliminates the potential for false search results caused by data within disconnected storage which has not yet been garbage collected. Only limited additional processing of the dump data is required, and known techniques for garbage collection utilized in the underlying operating system may be applied without significant modification to post-dump garbage collection.

It is important to note that while the present invention has been described in the context of a fully functional device, those skilled in the art will appreciate that the mechanism of the present invention and/or aspects thereof are capable of being distributed in the form of a computer readable medium of instructions in a variety of forms, and that the present invention applies equally regardless of the particular type of signal bearing media used to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of efficiently debugging dump data, comprising:

taking a system dump of contents within a system memory; and performing a garbage collection process on the system dump prior to debugging data within the system dump.

2. The method of claim 1, wherein the step of performing a garbage collection process on the system dump prior to debugging data within the system dump further comprises;

marking storage blocks which are the subject of existing pointers from active storage blocks, and deallocating storage blocks not referenced by any pointers from active storage blocks.

3. The method of claim 2, wherein the step of performing a garbage collection process on the system dump prior to debugging data within the system dump further comprises:

discarding data within a disconnected storage area of memory identified by marking storage blocks.

4. The method of claim 1, wherein the step of taking a system dump of contents within a system memory further comprises:

taking the system dump in response to a system failure.

5. The method of claim 1, wherein the step of taking a system dump of contents within a system memory further comprises:

taking the system dump in response to a request for an intentional dump.

6. The method of claim 1, further comprising:

after performing a garbage collection process on a system dump, examining the dump for causes of the system failure.

7. The method of claim 1, further comprising:

transmitting the dump from a first data processing system containing the system memory to a second data processing system; and reinitializing the first data processing system.

8. A mechanism for efficiently debugging dump data, comprising:

a data processing system running an operating system utilizing a garbage collection memory management scheme;

an error handler taking a system dump of a system failure; and a post dump garbage collection module performing a garbage collection process on the system dump prior to debugging of data within the system dump.

9. The mechanism of claim 8, wherein the post dump garbage collection module further comprises;

a module marking storage blocks which are the subject of existing pointers from active storage blocks; and a module deallocating storage blocks not referenced by any pointers from active storage blocks.

10. The mechanism of claim 9, wherein the error handler takes the system dump in response to a system failure.

11. The mechanism of claim 9, wherein the error handler takes the system dump in response to a request for an intentional dump.

12. The mechanism of claim 11, wherein the post dump garbage collection module further comprises:

a module consolidating active storage blocks after deallocation of storage blocks for which no pointers are found.

13. The mechanism of claim 11, further comprising:

a debug tool for examining the dump for causes of the system failure after performing a garbage collection process on the system dump.

14. The mechanism of claim 11, further comprising:

a second data processing system, wherein the data processing system running an operating system utilizing a garbage collection memory management scheme transmits the dump to the second data processing system and then reinitializes itself.

15. A computer program product within a computer usable medium, comprising:

instructions for loading a system dump of the contents of a system memory; and instructions for performing a garbage collection process on the system dump prior to debugging data within the system dump.

16. The computer program product of claim 15, wherein the instructions for performing a garbage collection process on the system dump prior to debugging data within the system dump further comprise:

instructions for examining all storage blocks in the system dump;

instructions for marking storage blocks referenced by a pointer within an active storage block within the system dump; and instructions for deallocating storage blocks which were not marked.

17. The computer program product of claim 16, wherein the instructions for performing a garbage collection process on the system dump prior to debugging data within the system dump further comprise:

instructions for consolidating marked storage blocks after deallocating unmarked storage blocks.

18. The computer program product of claim 17, wherein the instructions for performing a garbage collection process on the system dump prior to debugging data within the system dump further comprise:

instructions for updating pointers in storage blocks moved during consolidation.

19. The computer program product of claim 16, wherein the instructions for performing a garbage collection process on the system dump prior to debugging data within the system dump further comprise:

instructions for discarding data within the system dump for which no references are found.

20. The computer program product of claim 18, further comprising:

instructions for loading the dump into a debug tool to examine the dump for causes of a system failure after performing a garbage collection process on the system dump.

* * * * *

UNITED STATES PATENT AND TRADEMARK OFFICE
CERTIFICATE OF CORRECTION

PATENT NO. : 6,226,761 B1
DATED : May 1, 2001
INVENTOR(S) : Viktors Berstis

It is certified that error appears in the above-identified patent and that said Letters Patent is hereby corrected as shown below:

<u>Title page,</u>
Item [75], please correct the inventor's name "VIKTOR BERSTIS" to -- VIKTORS BERSTIS --.

<u>Column 2,</u>
Line 1, please correct the word "ouch" to -- such --.

<u>Column 5,</u>
Line 57, please correct the word "it" to -- if --.

Signed and Sealed this

Twenty-sixth Day of March, 2002

Attest:

JAMES E. ROGAN
*Attesting Officer*  *Director of the United States Patent and Trademark Office*